United States Patent Office 2,759,289
Patented Aug. 21, 1956

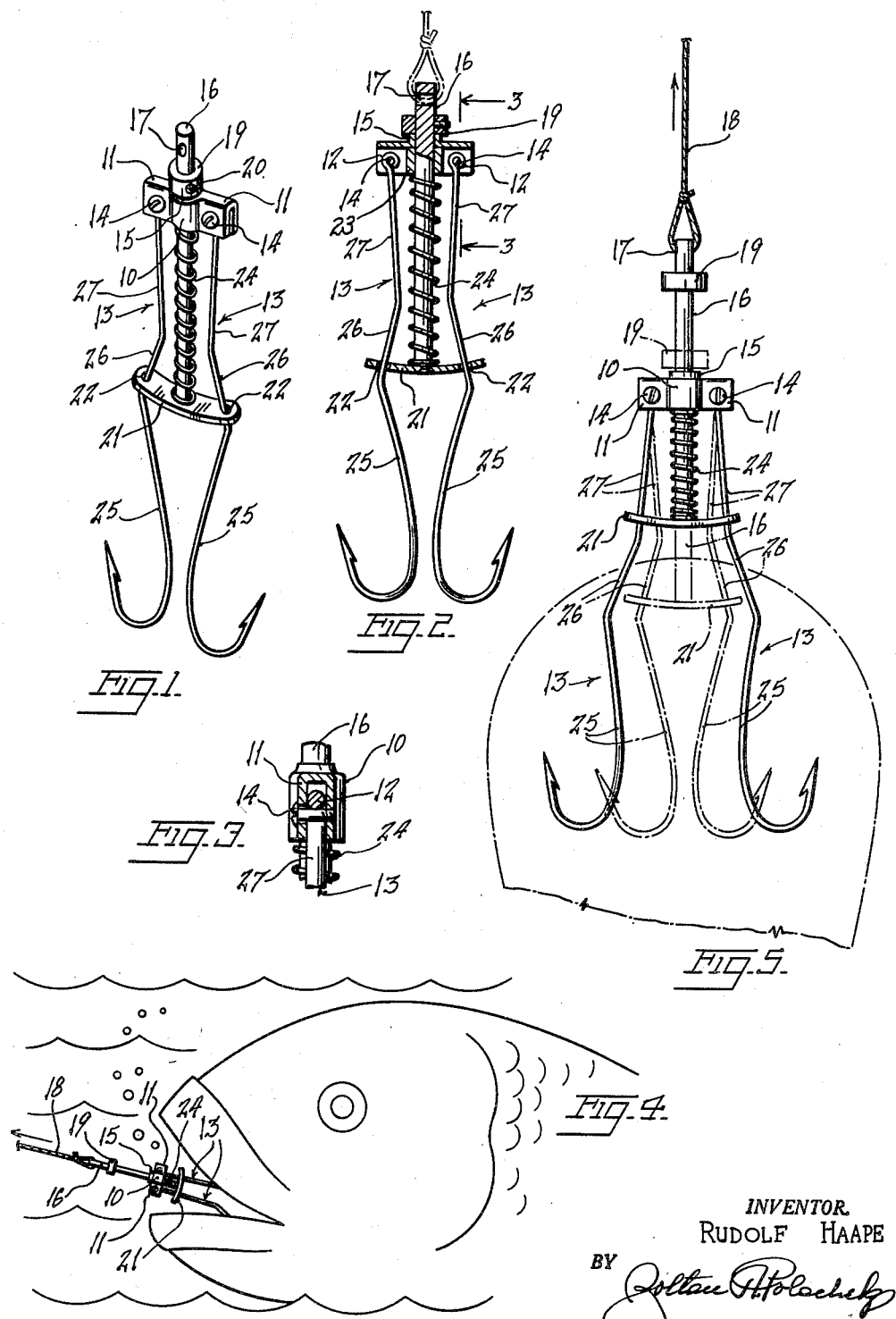

2,759,289
COMBINED ADJUSTABLE FISHING HOOK AND TRAP

Rudolf Haape, Bronx, N. Y.

Application May 28, 1954, Serial No. 432,980

1 Claim. (Cl. 43—37)

This invention relates to fishhooks.

It is an object of the present invention to provide a combined fishing hook and trap which includes a pair of oppositely disposed fishhooks which will automatically be spread apart when the fish line is under tension to more firmly hook the fish.

It is another object of the present invention to provide a combined fishing hook and trap of the above type wherein the hooks are easily and readily interchangeable with other hooks of varying sizes, depending on their requirements.

It is still another object of the present invention to provide a combined hook and trap of the above type wherein spring means are provided for returning the hooks to their normal position when tension is removed from the fishing line, which action serves to disengage the device from rocks or the like.

It is still another object of the present invention to provide a combined fishing hook and trap of the above type wherein the maximum expansion of the hooks can be easily and readily regulated, depending upon the fish which it is desired to catch.

Other objects of the present invention are to provide a combined fishing hook and trap bearing the above objects in mind which is of simple construction, inexpensive to manufacture, has a minimum number of parts, is easy to use and efficient in operation.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of the device.

Fig. 2 is a longitudinal sectional view thereof.

Fig. 3 is a fragmentary sectional view taken along the line 3—3 of Fig. 2.

Fig. 4 is a side elevational view showing the device in operative use.

Fig. 5 is an elevational view of the device showing the hooks expanded and showing in phantom the inoperative position of the hooks.

Referring now more in detail to the drawings, a cylindrical bracket member 10 is integrally formed on opposite sides with the laterally extending portions 11 of substantially inverted U-shaped cross section between which are received the looped ends 12 of the oppositely disposed fishhooks indicated generally at 13, the hooks being rotatably mounted within the laterally extending portions 11 by means of screws 14, screw-threaded therein.

The bracket 10 at its upper end is integrally formed with the hub portion 15 which slidably receives therethrough the shaft 16 having an opening 17 at its upper end for connection with the fishing line 18, the downward displacement of the shaft 16 through the hub 15 and bracket 10 being limited by an adjustable collar 19 having a set screw 20.

A curved cam plate 21 is mounted on the lower end of the shaft 16 and is provided with the oppositely disposed openings 22 which slidably receive therethrough the hooks 13. A bushing 23 is mounted within the bracket 10 and cooperates with the hub 15 to slidably receive the rod 16 therethrough.

A spring 24 sleeves shaft 16 intermediate the bracket 10 and cam plate 21 and serves to retain the shaft 16 in the extended position of Fig. 2.

It will be seen that each of the hooks 13 includes the usual hooked portion 25 integrally formed at its upper end with the inwardly bent portion 26 and terminating in the outwardly bent portion 27, substantially as illustrated.

In operation, the device is suspended from the line 18, as shown in Fig. 2, with the spring 24 retaining the hooks 13 in the retracted position. When the fish "bites" (Fig. 4), tension on the line 18 will retract the cam plate 21 away from the hook portions 25 against the action of spring 24 (Fig. 5) which will cause the hooks to expand to the position of Fig. 5, to more firmly secure the fish upon the hook. Thus, the more the fish fights, the greater will be the tension of line 18 and the more firmly will the hooks 13 become embedded. To retract the hook, it is only necessary to release the tension on the line 18.

In the event the hooks 13 become caught on rocks or the like, it is only necessary to tension the line 18 and to suddenly release the same, the camming action removing the hooks from the rock.

The hooks 13 may be removed by removing screws 14 to be replaced by larger or smaller hooks, depending upon the requirements. The hooks 13 may also be bent so as to provide a greater or smaller distance therebetween.

The inoperative distance between the hooks may also be regulated by adjusting the collar 19 along the shaft 16 by means of the set screw 20 to permit the hooks to be adjusted for fish of varying size.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A combined fishhook and trap comprising an elongated rod adapted for connection at one end to a fishing line, an arcuate-shaped camming and guiding plate secured to one end of the rod and extending beyond both sides of the rod, said plate having openings at the ends thereof, a cylindrical bracket with laterally extending portions, inverted U-shaped in cross section, slidably mounted on the other end of the rod, said laterally extending portions being in alignment with the laterally extending portions of the camming and guiding plate, a tension spring sleeved around the rod between the bracket and plate, fishhooks passing through the end openings in the plate and having their upper ends pivotally connected to the laterally extending portions of the bracket, said hooks having upper converging portions, intermediate diverging portions and lower converging portions, the lower converging portions terminating in barbed hooks, a collar slidably mounted on the rod above the bracket for regulating the movement of the bracket, and means for securing said collar to the rod in adjusted position.

References Cited in the file of this patent

UNITED STATES PATENTS

| | | |
|---|---|---|
| 95,755 | Angers | Oct. 12, 1869 |
| 936,980 | Bing | Oct. 12, 1909 |
| 1,046,302 | Jass | Dec. 3, 1912 |
| 1,670,275 | Willoughby | May 15, 1928 |
| 2,494,620 | Johnson | Jan. 17, 1950 |